(12) United States Patent
Mutka et al.

(10) Patent No.: US 7,507,265 B2
(45) Date of Patent: Mar. 24, 2009

(54) METHOD AND EQUIPMENT FOR PRODUCING HORTICULTURAL AND FUEL PEAT AND A FUEL PEAT PRODUCT

(75) Inventors: Kari Mutka, Jyväskylä (FI); Timo Nyrönen, Palokka (FI)

(73) Assignee: Vapo Oy, Jyvaskyla (FI)

( * ) Notice: Subject to any disclaimer, the term of this patent is extended or adjusted under 35 U.S.C. 154(b) by 649 days.

(21) Appl. No.: 10/958,774

(22) Filed: Oct. 5, 2004

(65) Prior Publication Data
US 2005/0081434 A1  Apr. 21, 2005

(30) Foreign Application Priority Data
Oct. 17, 2003 (FI) ................... 20035185
Sep. 9, 2004 (EP) ................... 04397020

(51) Int. Cl.
*C10L 5/00* (2006.01)
*C10L 7/00* (2006.01)
(52) U.S. Cl. .............. 44/490; 44/492; 44/630; 71/24
(58) Field of Classification Search ........... 44/490, 44/492, 630; 71/24
See application file for complete search history.

(56) References Cited

U.S. PATENT DOCUMENTS 1,656,859 A  1/1928  Jirotka ............... 44/490

FOREIGN PATENT DOCUMENTS

| FI | 56 853 | 10/1980 |
| FI | 93 855 | 2/1995 |
| GB | 125083 | 7/1920 |
| GB | 149869 | 8/1920 |
| GB | 606397 | 8/1948 |
| GB | 2148785 | 6/1985 |
| JP | 401157315 | * 6/1989 |
| SU | 1707202 | * 1/1992 |
| WO | 80/02319 | 10/1980 |

OTHER PUBLICATIONS

Moore, Ernest V., Air-drying peat, Journal of the Society of Chemical Industry, London (1921), 40, p. 229-30.*
Spedding Peter J., "Peat" Fuel, vol. 67, No. 7, Jul. 1988, pp. 883-900. XP002316806.

* cited by examiner

*Primary Examiner*—Cephia D Toomer
(74) *Attorney, Agent, or Firm*—Fildes & Outland, P.C.

(57) ABSTRACT

A method is disclosed for producing horticultural or fuel peat, in which
   the peat is removed from a bog,
   the removed peat is transferred from the bog to a drying field a distance away, in which the moved peat is dried, mainly by exploiting direct solar energy, so that the peat dries due to the effect of the solar radiation and the wind,
   after drying, the peat is moved from the drying location to further use or storage.

The drying field is a special surfaced field, essentially impermeable to water, created for drying, and the peat is spread on the field as a thin 1-15 cm layer of a high-consistency mass, with a solids content of 8-30%.

11 Claims, 6 Drawing Sheets

METHOD AND EQUIPMENT FOR PRODUCING HORTICULTURAL AND FUEL PEAT AND A FUEL PEAT PRODUCT

FIELD OF THE INVENTION

The present invention relates to a method and equipment for producing horticultural or fuel peat, in which
the peat is removed from a bog,
the removed peat is transferred from the bog to a drying field a distance away, in which the moved peat is dried, mainly by exploiting direct solar energy, so that the peat dries due to the effect of solar radiation and the wind,
after drying, the peat is moved from the drying location to further use or storage.

The invention also relates to a fuel peat product manufactured with the aid of the method. The invention also relates to the drying of tree-felling waste.

BACKGROUND OF THE INVENTION

An increasing number of bogs in production are reaching the stage in which their surface area is reducing and production is becoming difficult as the peat layer becomes thinner. On the other hand, the requirements of environmental permits have become stricter in terms of emissions to watercourses and of dust and noise. Production possibilities are also limited in the neighbourhood of settlements. It is increasingly difficult to obtain permits for new bogs, so that existing bogs, together with their margins should be exploited more fully.

A so-called hydro-peat method, for example, GB 166,576, is known, in which a water jet is used to remove peat from a bog and pump it as a very thin sludge to a drying field, which is usually an area of bog that has been taken out of production. The mass, which is spread on the field as a thin sludge, is allowed to dry for several weeks, after which at least longitudinal slits, preferably in a briquette-sod pattern, are made in the drying paste-like mat, thus forming separate briquettes when the mass dries. Using this technique, it is possible to obtain perhaps only a single harvest in a summer, so that the total production efficiency remains modest.

Finnish patent FI-93855 discloses a peat production method, in which wet peat is removed from a bog and collected to form a stack at a selected point in the peat field, the dried side surface of which is turned to the other side at regular intervals. In this case too, the production remains modest.

The basic problem in peat drying appears to be that drying takes place on a wet surface, which hinders the drying process. The drying that takes place during the day is often lost as a result of night dew. Finnish patent publication 56853 discloses a method, in which peat is lifted mechanically in winter and set as small sods on plastic to dry, allowing the sods to dry even before the bog is able to thaw out.

In the production of horticultural peat too, the aim is to dry the peat before processing it further.

SUMMARY OF THE INVENTION

The present invention provides a new type of method and equipment, with the aid of which bogs, together with their margins, can be utilized more fully, without dust, noise, and watercourse detriments.

A method for producing horticultural or fuel peat, in which
the peat is removed from a bog,
the removed peat is transferred from the bog to a drying field a distance away, in which the moved peat is dried, mainly by exploiting direct solar energy, so that the peat dries due to the effect of the solar radiation and the wind,
after drying, the peat is moved from the drying location to further use or storage, is characterized in that the said drying field is a special surfaced field, essentially impermeable to water, created for drying, and the peat is spread on the field as a thin 1-15 cm, preferably 2-6 cm layer of a high-consistency mass, with a solids content of 8-30%, preferably 15-25%.

A fuel peat product, which contains mainly dried peat in small solid sods and which has a moisture content of 20-50%, is characterized in that the peat used is a strongly conditioned high-consistency mass, the working corresponding to at least 10 minutes pumping at an average pressure of 2-80 bar, the high-consistency mass having a solids content of 8-30%, preferably 15-25%, and from which high-consistency mass sod blanks are made, which are allowed to dry essentially freely to the selected final moisture content.

A peat product spreader device, which includes a feed screw and a nozzle, is characterized in that the nozzle is formed between a rotatable spreader drum and a cover set close to it and is arranged to form a wide peat-mass mat on the base.

The invention also relates to a fuel peat product manufactured by the new method. If peat is spread as a high-consistency mass, with a solids content of typically 20%, much less water will need be evaporated than when using, for example, the hydro-peat method.

The peat is generally moved as a high-consistency mass, but, as an extreme embodiment, it is possible to envisage the peat being pumped as a thin sludge, being pressed to form a high-consistency mass at the side of the field, the water being returned to the bog, and the pressed high-consistency mass being spread on the drying field.

The drying field is preferably an asphalt field. The drying field preferably includes a medium circulation for bringing part of the drying heat from underneath. A special surfaced drying field brings a decisive advantage over a bog field. The under surface of the drying mass is no longer in contact with a wet base, which completely alters the drying conditions.

The peat is preferably moved by being pumped through a pipe from the lifting location to a storage silo, or direct to the field.

The invention can be applied in many different ways. The different preferred harvesting chains according to the invention can be shown as follows:

| Removal from bog | Transportation | Drying on field |
|---|---|---|
| 1. Suction dredging > | Pressing > Pumping > e.g., to 20% (working) solids | Drying (quick sod) |
| 2. Lifting with an excavator, Crushing and screening | > Pumping > (working) | Drying (quick sod) |
| 3. Lifting with an excavator Crushing and screening | > Granular peat trailer transport > Sod peat | drying -\| |

Drying includes the spreading of the mass on the field as a relatively thin layer.

A surprising phenomenon has been observed, in connection with high-consistency mass pumping, particularly in connection with piston pumping. As a result of the working caused by pumping, the peat sods dry excellently. It is possible to envisage that this particularly powerful working can naturally be achieved in other ways too than with the aid of pumping a high-consistency mass. The level of working required is, however, considerably more than what happens in known sod-peat machines. In high-consistency mass pumping from the bog to the field, the peat mass receives a powerfully abrasive treatment for at least 10 minutes, at an average pressure of 3-50 bar. The new fuel peat product, which is harvested as small sods, is much denser than any previously known peat product. The density of the sods is in the order of one, and can be even greater. In one test batch, the sods were dried using solar energy to a moisture content of 25%, in which case their thermal value was 4.1 MWh/tonne.

As granular peat, which also differs from previous types, the yield from the field is even slightly greater than that of the small-sod peat, but its density is less.

Horticultural peat benefits from the high drying efficiency.

According to the invention, the peat is lifted using suitable machines from either a bog that is entirely without preparation, or from one with basic drainage and pumped through a pipe to the field. There is less need for a road network.

Using trailer transportation, peat can also be lifted in late winter and transported over winter roads to stacks on the drying field. This avoids the freezing of the stacks and winter roads are cheap to construct. According to the invention, drying takes place surprisingly on an asphalt field, or on some other corresponding base during spring, summer, and autumn. In addition, according to the invention, drying is boosted with the aid of solar panels. In order to utilize solar energy, a network of pipes like underfloor heating is constructed under the asphalt, by means of which the solar energy is led under the asphalt and then heats the peat from underneath, in order to dry it. The solar panels used can be simple black, glycol-filled radiators. It is also possible to use other ways of recovering solar energy. The heat-transfer medium can also be heated in other ways, for example, using a peat-fired combustion plant, because the price of peat at the side of the drying field is naturally still quite low.

The harvesting equipment used is the simplest possible equipment, such as a wheeled loader, a spreader device, a bucket scoop, and, for example, a brush ridger, with the aid of which the dry peat is piled into a stack. With the aid of the invention, it is calculated that an annual production of at least 10 000 MWh/hectare (MHw/ha/a) can be achieved.

The use of the method and equipment according to the invention achieves, for instance, the following advantages:
- maximal utilization of solar energy,
- maximum drying effect, because:
  - the production period is extended, as there are no frost heave or base moisture and coldness problems,
  - as the asphalt is heated, it is possible to start early in spring, continue until late in autumn, start rapidly after rain, and make the peat drying more efficient at night too,
  - drying is made more efficient, as drying energy is received both as radiation from above and as heat from below,
  - short spells of dry weather can be exploited, as the base does not absorb moisture, and
  - weather conditions can be exploited with greater precision, because peat can be harvested rapidly from smaller surface areas,
- harvesting loss is reduced,
- environmental friendliness,
- precise utilization of peat from the bottom of a bog and from its edges, by excavation,
- preparation of the bog is not needed and peat can be transported using winter roads,
- exploitation of small and dispersed bog areas, the technology required is simple and durable,
- a long operating period is gained for the contractor's equipment (raw-peat lifting, drying stage, storage and delivery of peat),
- the product created is either a completely new type of sod peat (quick sod) or granular peat, which is similar to existing milled peat,
- reduction in weather risks/storage requirements,
- the area is rapidly available as a carbon sink.

Particularly in terms of environmental friendliness, it is important to operate in small areas at a time, when environmental and other detriments will be reduced. Water problems will also be reduced, as ditches may not necessarily be required in the lifting area and the peat is removed to the field at a high consistency. Correspondingly, dust problems do not arise in lifting. Noise problems too are alleviated, as production takes place in small areas at a time. The pumping is nearly silent. Lifting and transportation in winter are events of a short duration. In addition, the emissions from the production machines are reduced when production is made more efficient. The risk of fire is also reduced when operations take place in a small area and on an asphalt field, when it is easy to arrange monitoring and firefighting.

Various tests can be used to determine the drying rate of peat on asphalt or some other surface in various conditions. Though costs arise from the equipment and drying field, the increased and particularly more certain production is competitively cost-effective, especially as an operation complementing that of the peat bog.

These and other features and advantages of the invention will be more fully understood from the following detailed description of the invention taken together with the accompanying drawings.

DETAILED DESCRIPTION OF THE INVENTION

Figure 1:
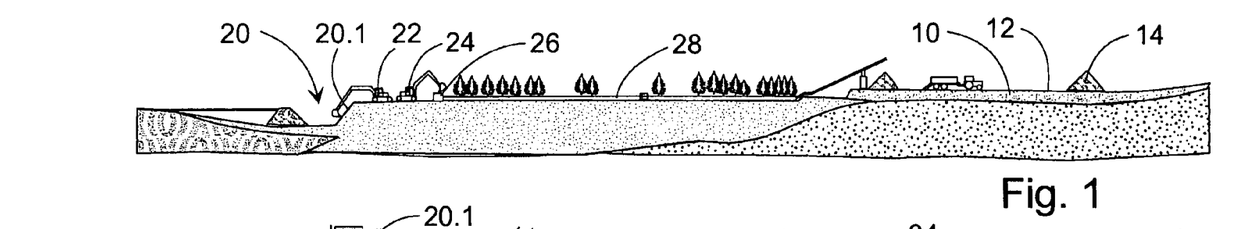
FIG. 1 shows a side view of a cross-section of the overall arrangement of a peat working site.
Figure 2:
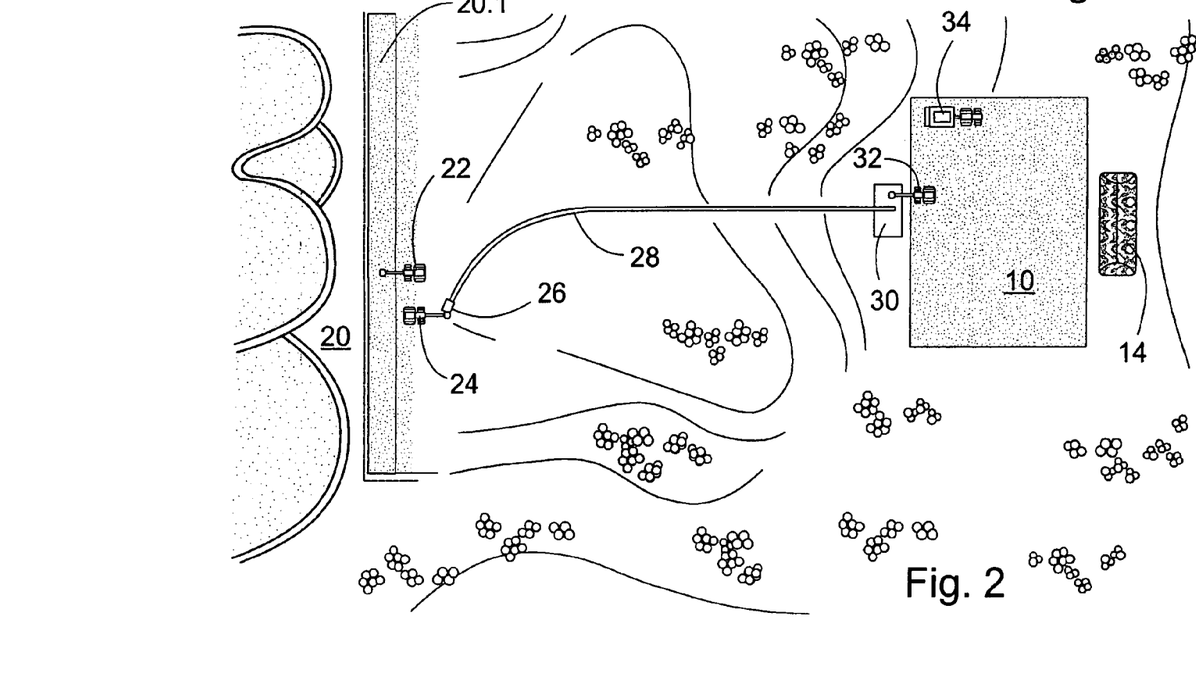
FIG. 2 shows a top view of the arrangement of FIG. 1.

In the arrangement shown in FIGS. 1 and 2, peat is lifted from the peat bog 20 and transported through a pipe 28 to the drying field 10. Most of the peat bog 20 can be in a natural state, as it is in this case. Only a small part of the bog, which is overgrown with forest, is drained (not shown) and cleared, the rest of the forest being allowed to remain in place until each little area in turn is used. The peat is lifted from the side 20.1 of the bog embankment using an excavator 22 and is screened by a loader 24 equipped with a crushing bucket, which transfers the lifted mass to the pump 26. The crushing bucket is of the type disclosed in U.S. Pat. No. 5,405,092 (ALLU®) and is used to screen out wood material, for instance.

In tests, a Putzmeister, Germany, double-piston pump KOS1050, equipped with a feed device THS 332 LIB was used. The pump was also equipped with the manufacturer's water-ring feed. The pipe 28 (diameter 150 mm) was assembled from sections, some of which were flexible, thus permitting the pump to be moved. If desired, the pump can also be mounted on a crawler chassis. The pipe 28 terminates in a storage silo 30, to which the peat is pumped for transfer to a spreader device 34. This is loaded using a bucket loader 32.

With the aid of water lubrication, the energy consumption of the pumping is about 4 kWh/t. The output of the test pump was 10-11 t/h (=m$^3$/h) over a pumping distance of 300 m, but this can be extended to at least 1000 m, when the pumping output will only suffer slightly. The diameter of the pipe was 150 mm. 360 l/h of water were used to lubricate the pumping, such a small amount having little effect on the drying, even though several pumps were to be used.

An appropriate production for a drying area of 1 ha can be obtained from a bog area of 3 ha, which was drained as lifting progressed (1 m/a). The production output (10 000 MWh/ha) is then the same as that of present milled peat production from an area of 20 ha.

The preferred surfacing of the special drying field 10 is asphalt, with a network of heating pipes arranged under or inside it, as will be described later. The method according to the invention will function without heating, but with its aid the production period can be extended and the production output increased. The dried peat, either sod or granular peat, is collected in a storage stack 14 to await transportation elsewhere. If rain falls, the drying granular peat layer can be temporarily collected in a stack, from which it is then spread again. The drying field 10 is cambered and has rainwater drains to lead rainwater rapidly off the field.

The peat can be spread as an even mat, using either a special spreader device, or using a throwing spreader, in the same way as a manure spreader. However, when using throwing spreading, it would be advantageous to spread the peat already as granules, and not to break the mass when spreading it, as happens, for example, when using a disc spreader.

Figure 3A:
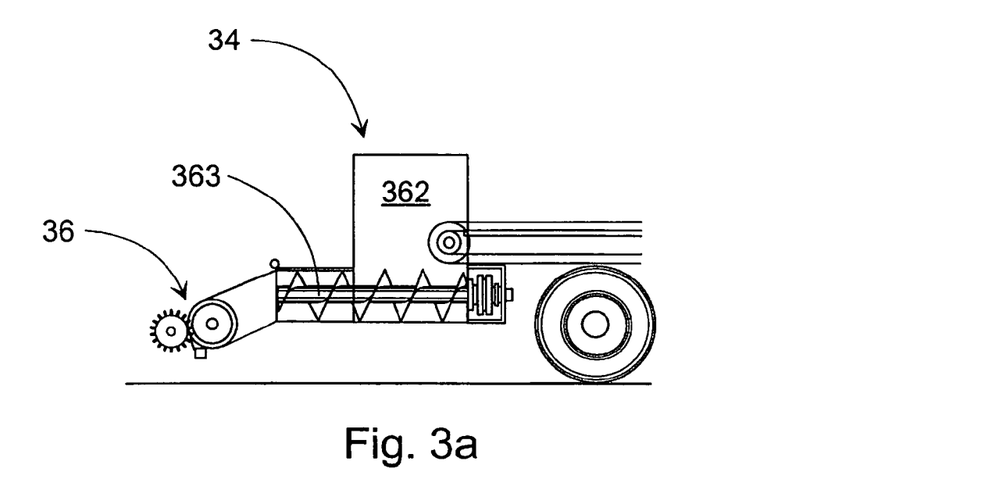
FIG. 3a shows a side view of a partial cross-section of a spreader device for a high-consistency mass.
Figure 3B:
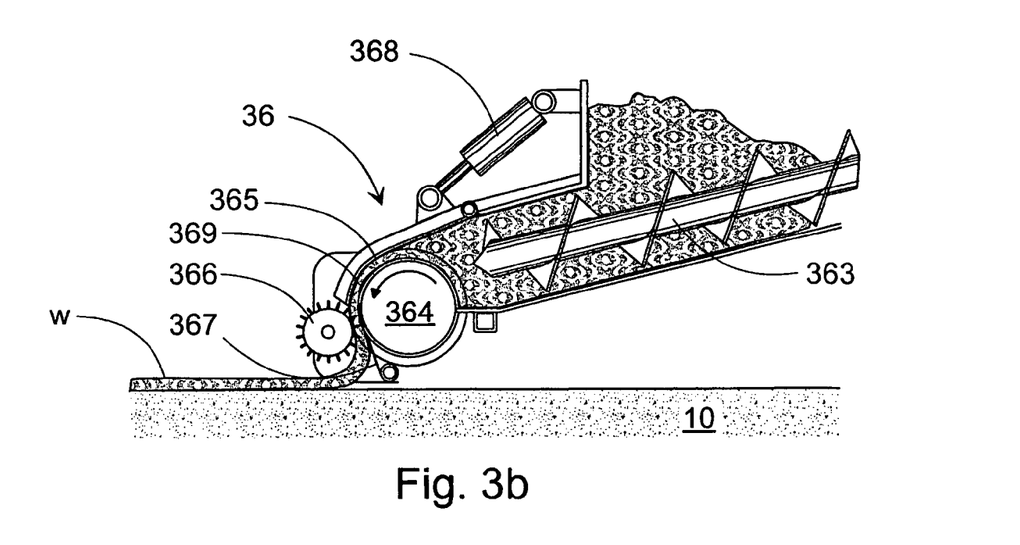
FIG. 3b shows an enlargement of the device of FIG. 3a when in operation.

FIG. 3a shows a partial cross-section of a spreader device 36 installed on a trailer. The bottom conveyor belt brings the mass to a trough 362, from which it is fed to the spreader end, which is shown in greater detail in FIG. 3b. At the spreader end there is a spreader drum 364 (diameter 250 mm and width 2.5 m) and a jointed upper cover 365, which is operated using an operating device 368. Between these a nozzle 369 is formed, which can be adjusted to affect the thickness of the compressed peat mat W being discharged. Immediately beneath the discharge opening and also against the spreader drum 364 there is a sod patterning roller 366, which presses a sod pattern into the peat mat W. A scraper 367 ensures that the peat mat detaches from the spreader drum 364. When it dries, the peat mat W breaks up into the defined parts and forms sods of peat. The peat sods are allowed to dry either completely in peace, or else they may be moved slightly to the side on the hot part of the exposed asphalt.

Figure 4:
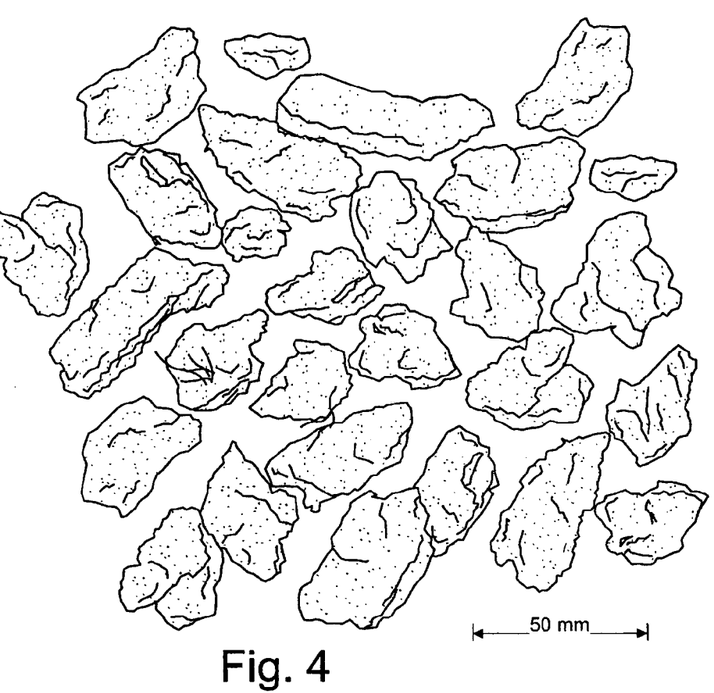
FIG. 4 shows sods of the new fuel peat product.

FIG. 4 shows a scale drawing of the peat sods obtained as the result of one test. The height of these peat sods (at right angles to the plane of the figure) as, with a small dispersion, about 15 mm, when the original spreading thickness was about 20 mm. The density of the peat sods at a 50% moisture content is nearly one, or even more. The sods are dense, firm, and hard, so that they will withstand mechanical handling without dust detriments. The peat sods can easily dry to a solids content of 70-75%. Their thermal value is then 3.8-4.1 MWh/t. The loose density of the product formed is 490-510 kg/m$^3$.

Figures 5A, 5B:
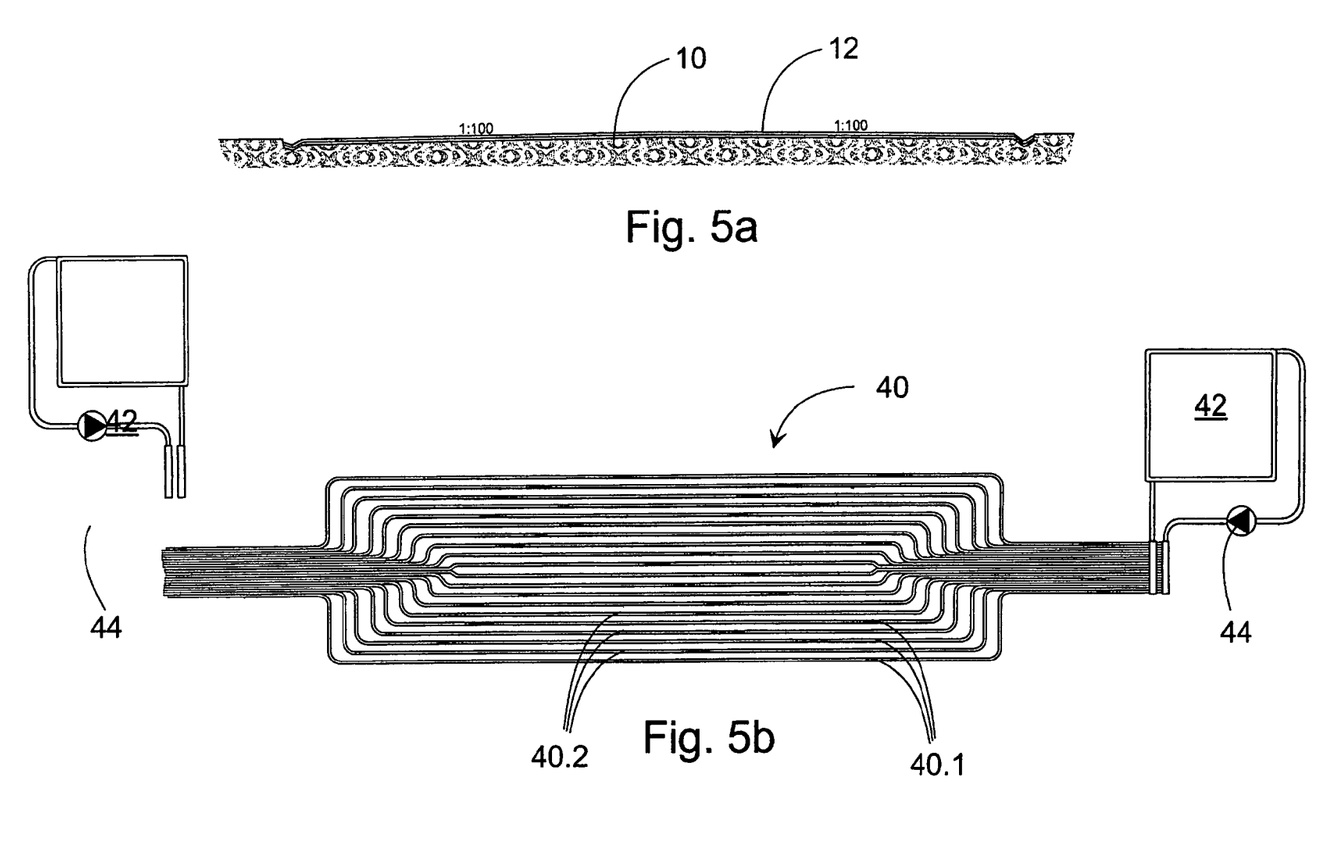
FIG. 5a shows a side profile of the drying field.
FIG. 5b shows the heating pipe circuit connected to the solar collectors.

FIG. 5a shows a side profile of one drying field 10. In any event, there is an insulating layer 12 underneath the asphalt surfacing. The possible heating layer is either inside the asphalt or in contact with its under surface on top of the insulating layer. A narrow canopy (not shown) can be used on the field, under which the spread layer can be gathered if rain threatens the stack and then spread again after the rain when the rain has run off into the drains and the surface of the asphalt has dried.

According to FIG. 5b, the network of heating pipes 40 preferably includes pipes 40.1, 40.2 arranged in a staggered pattern, which are fed from solar collectors 42 at opposite ends using pumps 44. In this way, even heating is achieved over the entire area of the field. In this case, the size of the block is 5 m×40 m, with the pipes being spaced at 200 mm intervals. They are placed at a depth of 80-100 mm. The pipes are 20 mm diameter plastic pipes (UPONOR® Wirsbo 20×2.0 PN6 Q&E pePEX).

A heat transfer medium (a water/glycol mixture), which is heated using the said solar collectors 42, circulates in the piping.

The thermal capacity of the heat transfer medium means that the heating and thus also the drying continues even after the sun has set. In the summer, the surface of the asphalt can easily heat to as much as 50 degrees (° C.) and the medium in the solar collectors to as much as more than 70 degrees. Due to the base and the heating, the drying is so rapid that the necessary drying surface-area is about one-twentieth of that required for the conventional production method. Thus, the surface area of the base required ranges from thousands of square meters to a few hectars. Preferably 2-30% of this has underneath heating, most preferably 5-15%. In certain conditions, even a small amount of heating will have a considerable effect on the moisture balance.

Figure 6:
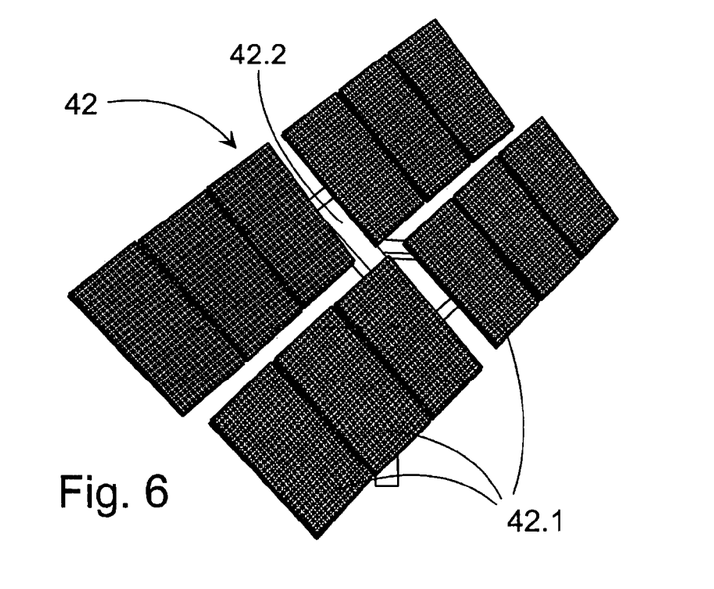
FIG. 6 shows a solar collector.

Some known type of solar collector 42 can be used. According to FIG. 6, a single collector includes several modules 42.1 assembled in the same group, together with a frame 42.2 supporting them. Generally, the frames are set at a fixed angle, but a rotating device can also be used, in order to maximize energy production.

Figure 7:
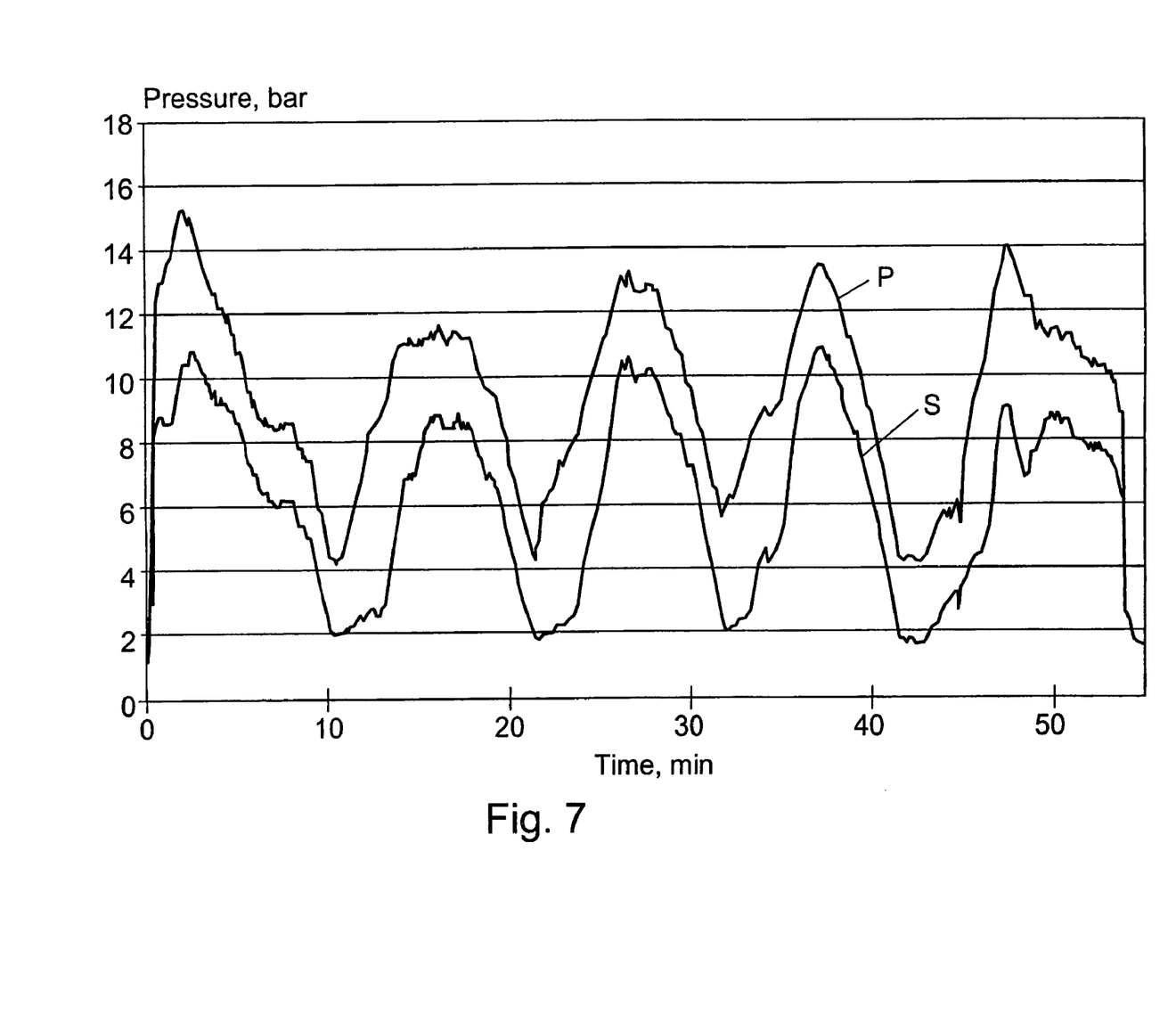
FIG. 7 shows the pressure variations in the mass pumping, at the pump and in the piping.

When peat is pumped at a consistency of 20%, a powerful working takes place. FIG. 7 shows a pumping test carried out in a 100 m pipe (dia. 5.5"), in which it takes 7 minutes to transport the peat 100 m. Water lubrication was 4.5 liters/min. According to the figure, when the peat is being moved in the piping, it is possible to detect a pressure-variation cycle of about 10 minutes, both at the pump (P) and over the distance (S=50 m). In this case, the interval of the strokes of the piston is only a few seconds, i.e. considerably shorter than this interval. Because the transportation of the peat mass, for example, over a 300 m distance, lasts for about 20 minutes, this creates an abrasive working of a considerably long duration, which surprisingly improves the drying properties of the peat considerably better than previously. The cell structure of the peat is broken down in such a way that drying can take place more easily than in peat in a natural state.

Figure 8:
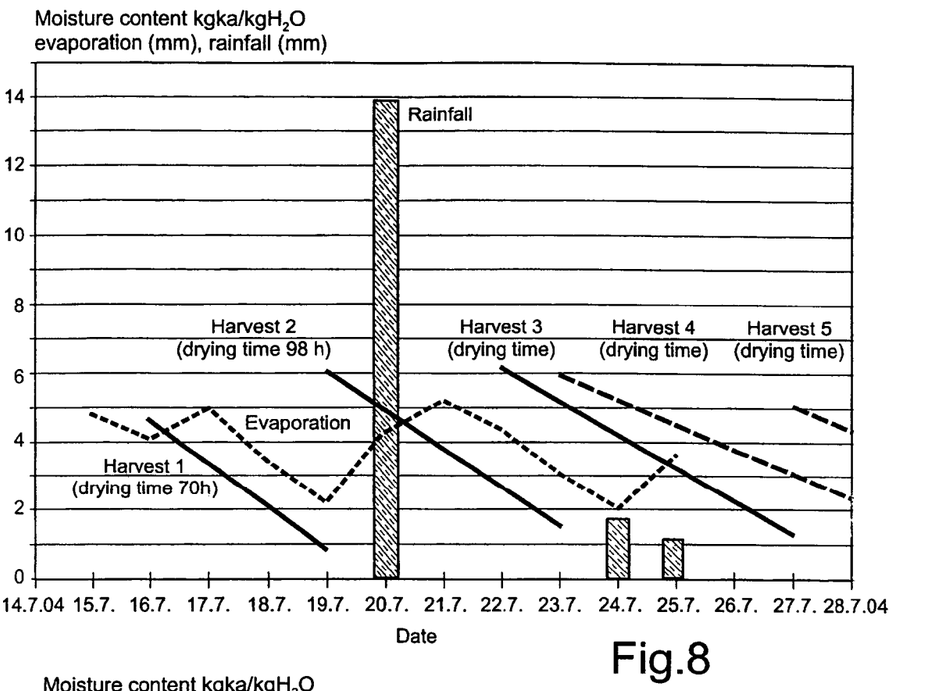
FIG. 8 shows the harvesting cycles of so-called quick-sod peat.

FIG. 8 shows the harvesting cycles of the new fuel peat product, which is called quick sod, under quite poor conditions (without heating underneath). The evaporation was generally less than 5 mm, whereas the best figure is 6-7 mm. The amounts of rain are shown as vertical columns and they naturally prolonged the drying time. In good conditions, a harvesting cycle of one day can be achieved.

Figure 9:
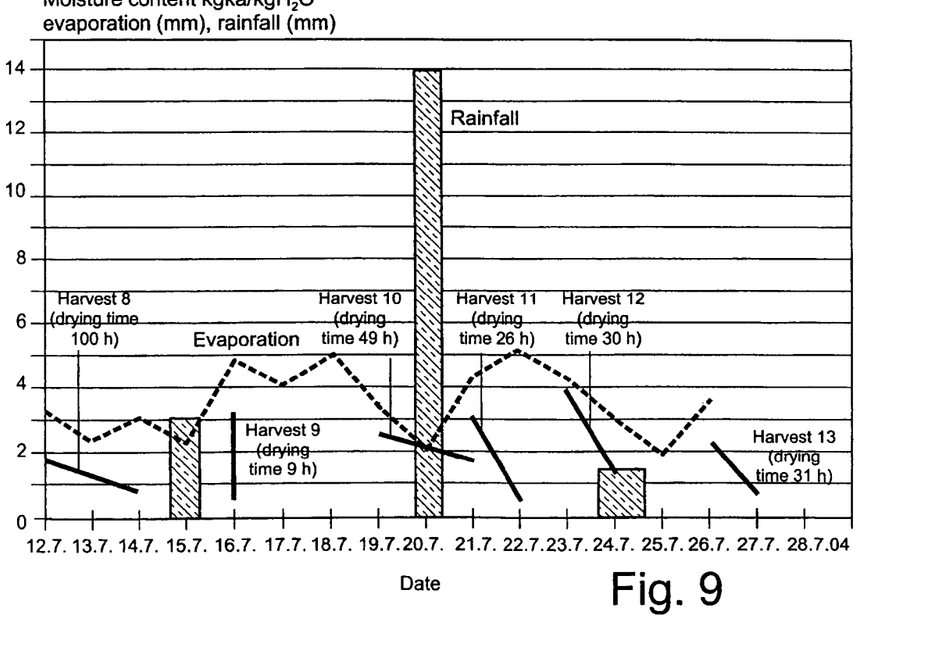
FIG. 9 shows the harvesting cycles of the new granular peat.

Data on Five Test Harvests (Quick Sod)
initial moisture content of peat 82-86%
loading 180-200 m³/ha
yield 95-105 m³/ha
drying time 70-120 h
180-200 MWh/ha/harvest FIG. 9 shows the corresponding harvesting cycles for granular peat, without heating underneath. In good conditions, (harvest 9), the drying time was nine hours. At best, it is possible to achieve (in Finland) up to three harvest cycles in a day.

13 Test Harvest Data (Granular Peat)
initial moisture content of peat 74-77%
loading 100-120 m³/ha
yield 55-70 m³/ha
drying time 10-100 h
60-76 MWh/ha/harvest According to the invention, the asphalt field can also be used to utilize tree-felling waste. In that case
the felling waste is collected from the forest and transported to the drying site a distance away,
the felling waste are chipped to form woodchips,
at the drying site, the chips are dried essentially by using direct solar energy, so that the chips dry through the effect of solar radiation and the wind,
after drying, the chips are transported from the drying site for further user, or to storage.

The drying site referred to here is an asphalt-surfaced drying field, on which the chips are spread as a thin layer 1-10 cm, preferably 1-5 cm thick. The drying takes place according to the same inventive idea as the drying of peat, with the aid of solar energy and possibly assisted by heating from underneath.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method for producing horticultural or fuel peat comprising the steps of:
    lifting peat from a bog,
    pumping the lifted peat as a high-consistency mass having a solids content of 8-30% from the bog to a drying field by a pipe and a piston pump abrasively working the peat and breaking the cell structure of the peat to improve drying properties of the peat, the drying field being located a distance from the bog and being a special surfaced field essentially impermeable to water and created for drying,
    spreading the pumped peat on the drying field as a thin 1-15 cm layer,
    drying the spread peat on the drying field, where peat is dried mainly by exploiting direct solar energy, the peat being dried due to the effect of solar radiation and wind,
    moving the dried peat from the drying location to further use or storage.

2. A method according to claim 1, wherein the field is heated using an internal circulation of a medium beneath the spread peat layer, in order to heat the peat layer.

3. A method according to claim 1, wherein the medium circulation is at least partly heated using solar collectors located at the side of the field.

4. A method according to claim 1, wherein the field includes an asphalt surface.

5. A method according to claim 1, wherein the peat is pumped at essentially a consistency suitable for spreading.

6. A method according to claim 1, wherein at least at one point a coaxial water jacket is led to the pipe, in order to reduce friction.

7. A method according to claim 1, wherein division patterns are pressed into the spread layer, in order to create sods of a uniform size.

8. A method according to claim 7, wherein the sod size of the division pattern is 10-40 mm over the largest dimension.

9. A method according to claim 1, wherein granulated peat is formed, by turning the drying mass at least once.

10. A method according to claim 1, wherein the peat is lifted from the bog by an excavator and crushed and screened for transfer.

11. A method according to claim 1, wherein the peat is lifted from the bog by suction dredging and pressed to the said solids content.

* * * * *